United States Patent [19]
Willeby

[11] Patent Number: 5,457,948
[45] Date of Patent: Oct. 17, 1995

[54] CROP HARVESTER ATTACHMENT AND METHOD OF USING SAME

[75] Inventor: Billy J. Willeby, Coolidge, Ga.

[73] Assignee: Hydrapak Corporation, Morgan, Ga.

[21] Appl. No.: 235,254

[22] Filed: Apr. 29, 1994

[51] Int. Cl.⁶ .................................................. A01D 46/10
[52] U.S. Cl. ................................................ 56/30; 56/12.8
[58] Field of Search ................................ 56/12.8, 13.3, 56/30, 31, 32, 28, DIG. 2

[56] References Cited

U.S. PATENT DOCUMENTS

| | | | |
|---|---|---|---|
| 101,439 | 4/1870 | Davis, Jr. et al. | 56/30 |
| 196,386 | 10/1877 | Powell | 56/30 |
| 2,691,861 | 10/1954 | Lock et al. | 56/13.3 X |
| 2,832,185 | 4/1958 | Gardner | 56/28 |
| 3,174,265 | 3/1965 | Capps | 56/30 X |
| 3,332,220 | 7/1967 | Lofgreen et al. | 56/30 |
| 3,675,405 | 7/1972 | Denton | 56/328 |
| 3,964,245 | 6/1976 | Hecht | 56/331 |
| 4,027,464 | 6/1977 | Stone | 56/30 |
| 4,194,346 | 3/1980 | Ingalls | 56/328 |
| 4,406,112 | 9/1983 | Brooks | 56/12.9 |
| 4,783,951 | 11/1988 | Richards et al. | 56/12.9 |
| 4,866,919 | 9/1989 | Brooks | 56/12.9 |
| 4,884,392 | 12/1989 | Czajkowski et al. | 56/13.1 |
| 4,914,896 | 4/1990 | Gullickson | 56/12.9 |
| 5,036,649 | 8/1991 | Thedford et al. | 56/13.3 |
| 5,129,216 | 7/1992 | Gullickson | 56/12.9 |
| 5,134,837 | 8/1992 | Casey et al. | 56/12.8 |

FOREIGN PATENT DOCUMENTS

| | | | |
|---|---|---|---|
| 1134135 | 1/1985 | U.S.S.R. | 56/30 |

*Primary Examiner*—David J. Bagnell
*Attorney, Agent, or Firm*—Fitzpatrick, Cella, Harper & Scinto

[57] ABSTRACT

The present invention relates to an attachment for a crop harvesting apparatus, such as a cotton picker, to improve the yield thereof. A fluid source provides a pressurized fluid. A pipe, oriented substantially parallel to the ground, is coupled at a proximal end thereof in fluid communication with the fluid source. The pipe is provided with a plurality of holes therein, the holes being oriented such that the pressurized fluid passes through the holes in an upward direction to suspend the crop prior to and during harvesting, or to cause movement or turbulence of the bolls of cotton to increase the probability of the bolls being harvested by the harvesting apparatus.

44 Claims, 4 Drawing Sheets

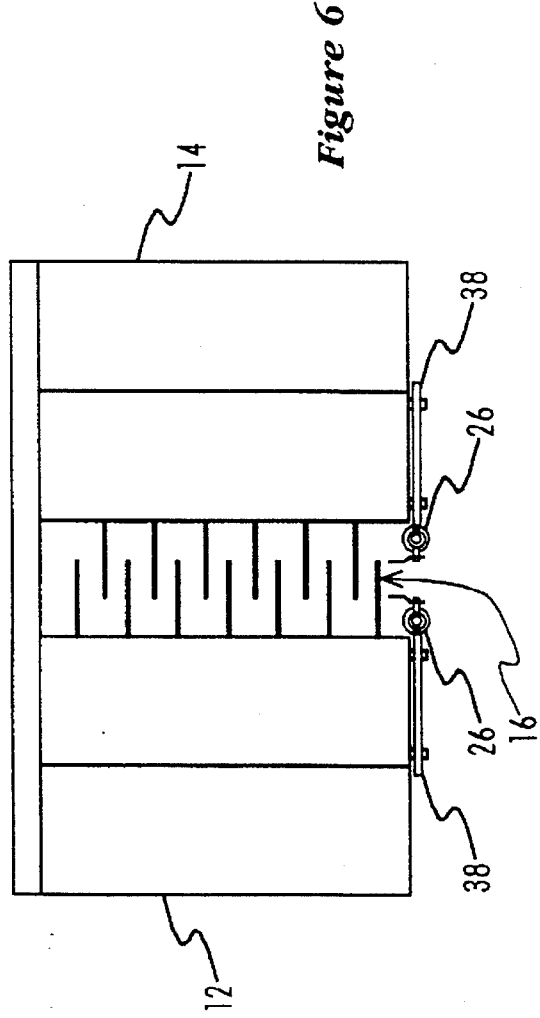
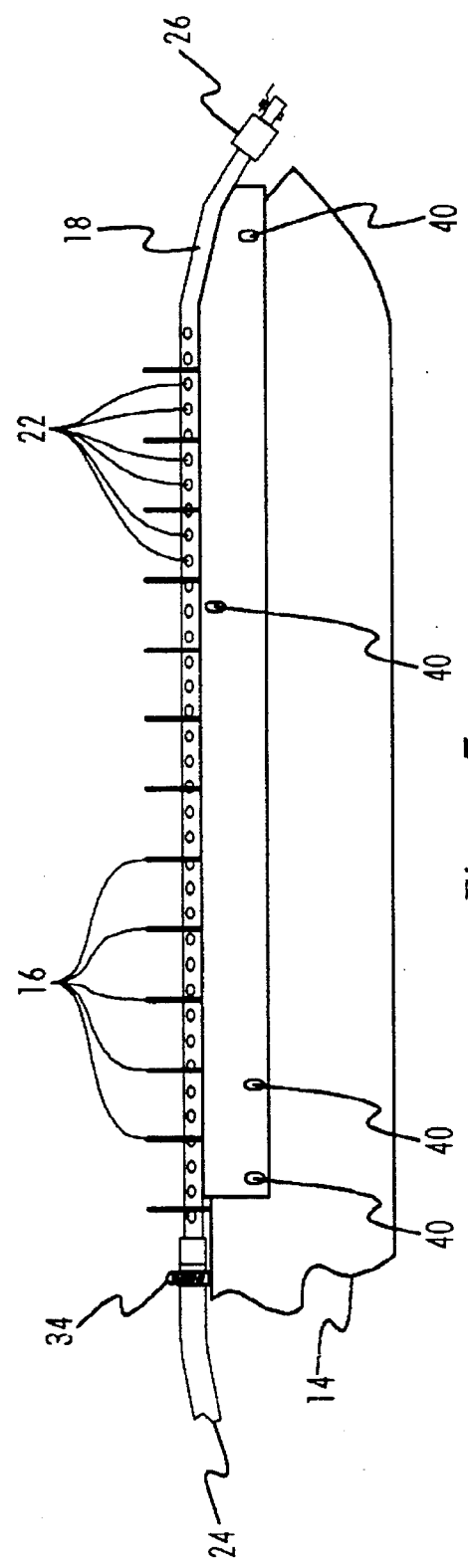

CROP HARVESTER ATTACHMENT AND METHOD OF USING SAME

BACKGROUND OF THE INVENTION

1. Field of the Invention

The present invention relates generally to an attachment for use with a crop harvester and, more specifically, relates to an attachment whereby a fluid, such as pressurized air, is used to temporarily suspend or move a falling crop, such as detached cotton bolls, proximate an above-ground harvesting member to thereby improve the yield of the harvesting operation, and also to cause movement of the crop while within reach of the harvesting member, also to increase the harvest.

2. Description of the Prior Art

Conventional harvesters used to harvest crops, such as cotton, typically achieve less than ideal yields for a variety of reasons. Decreased yields may be caused, for example, by the physical characteristics of the crop to be harvested and are particularly acute in the case of relatively fragile crops, such as cotton. Typically, many cotton bolls awaiting harvesting have already been open for several weeks, during which time the stems have deteriorated to a point that bolls are frequently caused to fall to the ground by the stalk vibration and air currents generated by an approaching harvester. The operators of cotton harvesters often see such bolls fall to the ground immediately before the harvesting members reach the plant. In addition, bolls near the bottom of the cotton plants are frequently dropped if the bolls are not directly contacted by the spindles of the harvester, or if the spindles are worn or not sharp enough to aggressively grasp the cotton. Dislodged cotton bolls that fall to the ground without being harvested are typically lost. Also, some bolls may be left on the stalks after the harvester passes. This is a severe problem, especially with small stalks of cotton that do not crowd the harvester enough to cause aggressive picking by the spindles.

Various attachment apparatus which attempt to improve the yield of conventional harvesting machines have been developed in the past. For example, U.S. Pat. Nos. 3,332,220 to Lofgreen, 4,027,464 to Stone and 5,036,649 to Thedford, et al. are each specifically directed to attachments for use with a cotton harvester.

Lofgreen provides an apparatus which uses a vacuum to attempt to recover loose cotton that has fallen to the ground. The effectiveness of the Lofgreen apparatus, however, is dubious, in large part because the quality of cotton bolls which fall to the ground prior to being harvested quickly deteriorates.

Stone attempts to recover cotton missed during the harvesting operation (that is, left on the plant) by providing a pair of opposing intake manifolds positioned behind the harvester. Each of the intake manifolds uses a vacuum to suck the cotton remaining on the plant through ducts back to the harvester for treatment in a conventional manner. Thedford, et al. discloses a particular duct structure for conveying cotton once it is received by the harvester. An air directing apparatus creates a vacuum for facilitating the passage of cotton through the ducts to a basket or receptacle 20. Both Stone and Thedford, et al., however, require complicated duct structures to recover plant-borne cotton bolls initially missed by the harvester, adding complexity and expense to an already costly apparatus. Further, the use of vacuum apparatus to improve the yield of a harvester, in order to achieve maximum effectiveness, can require that a tray or the like be provided to catch the crop before it hits the ground, thus adding additional complexity.

Other prior art attempts to improve crop yield have explored the use of various blower configurations mounted forward of a harvesting unit, which direct air rearwardly and/or downwardly toward the harvester. In addition to requiring complicated and expensive mounting and duct assemblies, because such systems blow the crop to be harvested in a rearward and/or downward direction, it is believed that the systems do not consistently prevent the crop from reaching the ground prior to being harvested. Moreover, if the blower assemblies of such systems become misaligned, the systems may actually serve to blow the crop into the ground ahead of the harvesting unit, thus causing an increase in crop loss.

Accordingly, it is an object of the present invention to provide an attachment for use with a harvesting apparatus, which will suspend a crop such as cotton prior to and during harvesting, and which also causes movement of the crops, helping to bring more fruit (e.g., cotton bolls) in proximity to spindles or other harvesting members. It is a further object of the present invention to provide such an attachment which is simple in design and relatively inexpensive to construct.

It is another object of the present invention to provide a crop harvesting apparatus which incorporates such an attachment.

It is yet another object of the present invention to provide a crop harvesting method whereby a falling crop is temporarily suspended in the air until the harvesting members can reach it.

Additional objects and advantages of the invention will be set forth in part in the description which follows, and in part will be obvious from the description, or may be learned by practice of the invention. The objects and advantages of the invention will be realized and attained by means of the elements, combinations and methods particularly pointed out in the appended claims.

SUMMARY OF THE INVENTION

To achieve the above objects and in accordance with the purpose of the invention, as embodied and broadly described herein, according to a first preferred embodiment of the present invention there is provided an apparatus for suspending a crop to be harvested, and causing movement of the crop, comprising a fluid source for providing a pressurized fluid. A pipe, coupled at a proximal end thereof in fluid communication with the fluid source, has a plurality of holes provided therein, the holes being oriented such that the pressurized fluid passes through the holes in an upward direction to cause movement or turbulence of the bolls of crop to increase the probability of the crop being harvested by the harvesting apparatus.

According to a second preferred embodiment of the present invention there is provided a harvesting apparatus, comprising a harvesting member for receiving a crop to be harvested. A fluid source is secured to the harvesting member and provides a source of pressurized fluid. A pipe, positioned below said harvesting member and coupled at a proximal end thereof in fluid communication with the fluid source, is also provided and has a plurality of holes therein. The holes in the pipe are oriented such that the pressurized fluid passes through the holes in an upward direction to suspend the crop proximate the harvesting member, and to cause movement of the bolls that are still attached to the plant, helping to bring them within reach of the harvesting members, e.g., by shaking them off or bending the plant.

According to a third preferred embodiment of the present invention there is provided a harvesting method whereby a harvesting member is advanced proximate a crop to be harvested. A pressurized fluid is provided to a pipe positioned below the harvesting member, the pipe having a plurality of holes provided therein. The holes in the pipe are oriented such that the pressurized fluid passes through the holes in an upward direction to suspend and cause movement of the crop proximate the harvesting member.

The accompanying drawings, which are incorporated in and constitute a part of this specification, illustrate a preferred embodiment of the invention and, together with the description, serve to explain the principles of the invention.

BRIEF DESCRIPTION OF THE DRAWINGS

FIG. 6 illustrates a second preferred embodiment of the present invention, wherein a pair of harvester attachment apparatus are positioned for use in connection with the harvester illustrated in FIG. 1A; and FIG. 7 illustrates various components of the harvester attachment apparatus illustrated in FIG. 2, including the extension member, an associated clamp, a pipe, a second valve assembly and mounting means.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1B:
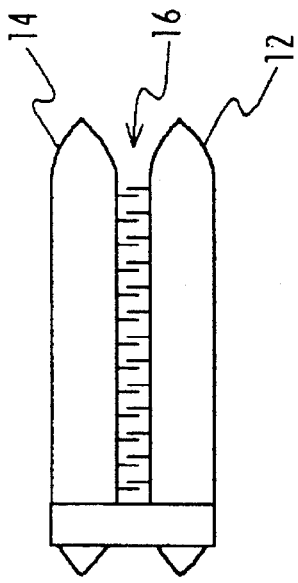
FIG. 1A illustrates a conventional crop harvester and FIGS. 1B and 1C illustrate harvesting members and spindles of the harvester illustrated in FIG. 1A.
Figure 1C:
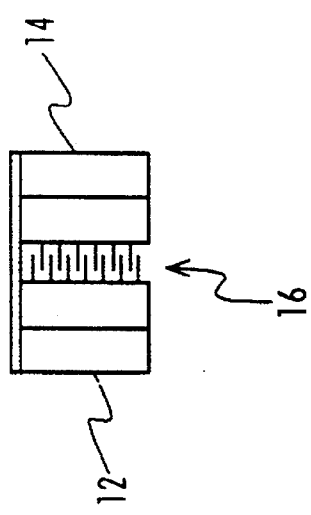
Figure 1A:
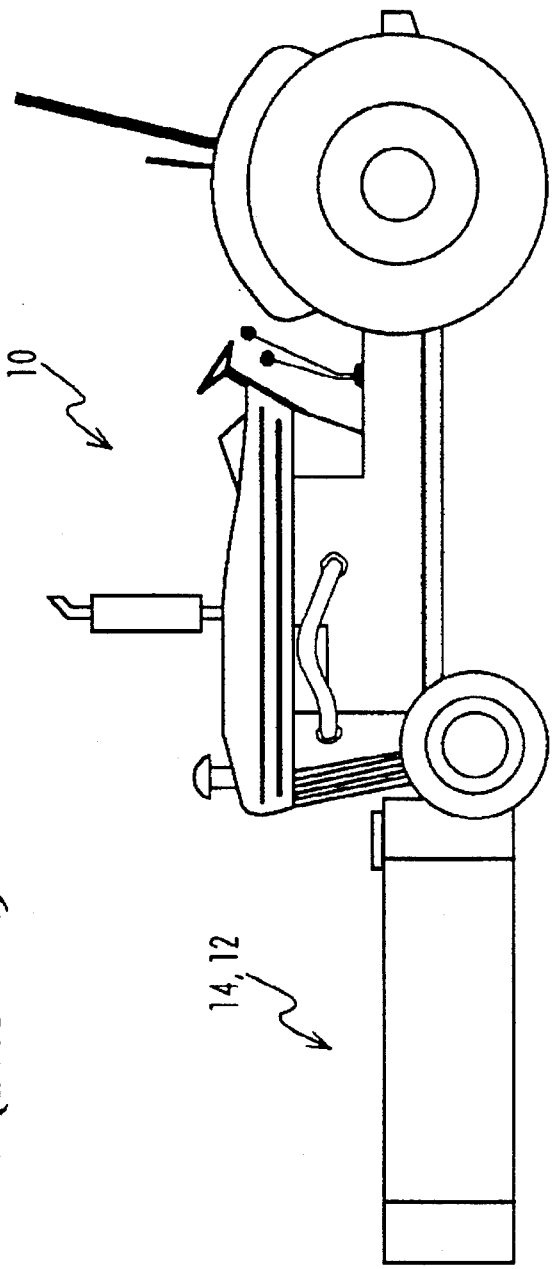

Referring to FIG. 1A, there is illustrated a crop harvester 10. Harvester 10 is of conventional construction and may be any of various types of harvesters commercially available, for example., from John Deere & Company and Case International. Preferably, harvester 10 comprises a John Deere Model 9920 harvester, as described in the John Deere Model 9920 Operator's Manual, the contents of which are hereby incorporated by reference.

Harvester 10 is a self-propelled machine, e.g., a cotton picker or a cotton stripper, designed to advance through a field while harvesting rows of crops planted therein. Harvester 10 is provided with first and second harvesting members 12, 14 provided in front of the harvester on the right and left sides, respectively. The pontoon-like first and second harvesting members 12, 14 are configured and positioned with a space therebetween and harvester 10 is operated such that the row of crops to be harvested (not shown) is received in the space between the harvesting members.

The respective inside surfaces of first and second harvesting members 12, 14 are provided with a plurality of slotted panels (not shown). A plurality of vertical rods (also not shown) are rotatably mounted immediately behind each panel. As shown in FIGS. 1B and 1C, a plurality of barbed spindles 16 extend horizontally from each rod. (The barbs are too small to be depicted in the drawing.) Spindles 16 are thus configured in a plurality of vertical columns. Each spindle-bearing rod is rotated about its axis at a speed which varies as a function of the speed of forward travel of harvester 10. Most of the crop to be harvested, e.g., cotton bolls, becomes attached to any whirling spindle that touches it and is pulled off the plant, through the corresponding horizontal slot in the panel of the harvesting member, and into the interior of the harvesting member. While spindles 16 are inside first and second harvesting members 12, 14, the crops are detached from spindles 16 by conventional means, such as doffers or the like (not shown). The harvested crops are then transferred in a conventional manner to a storage basket (not shown) provided elsewhere on harvester 10.

The construction of the other elements of harvester 10 illustrated in FIG. 1A is well known to those of ordinary skill in the art and therefore will not be set forth herein. It should be noted, however, that harvester 10 is provided with at least one compressor, fan or the like for providing a source of pressurized fluid, such as air. The compressors provided on harvester 10 are used for various applications including, for example, the transfer of the picked crop from first and second harvesting members 12, 14 to the storage basket.

Figure 2:
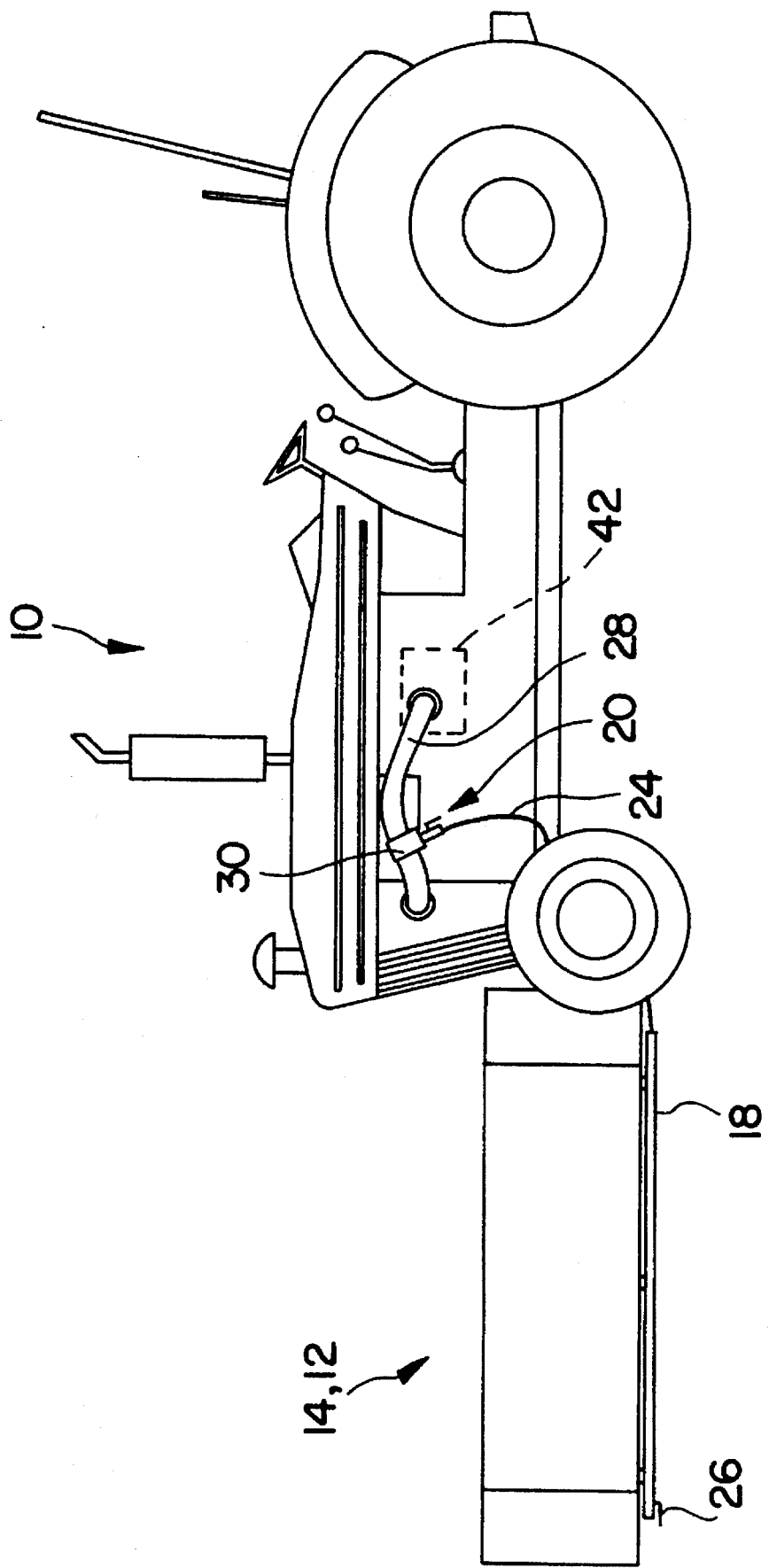
FIG. 2 illustrates the harvester attachment apparatus according to the preferred embodiment of the present invention positioned for use in connection with the harvester illustrated in FIG. 1A.

The harvester attachment apparatus of the present invention is illustrated in FIG. 2, the attachment being positioned for use in connection with the harvester illustrated in FIG. 1. As shown in FIG. 2, there is provided a source of pressurized fluid 42, such as an air compressor, fan or the like. The pressurized fluid from the source 42 passes through a hose, pipe or other conduit 28. There is also provided a first regulator valve 20, an elongated, flexible air-tight extension member 24, such as a rubber or plastic hose or the like, a pipe 18 and a second valve 26.

Figure 3A:
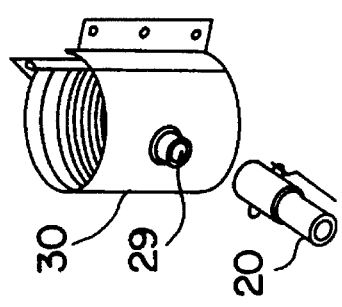
FIGS. 3A and 3B illustrate various components of the harvester attachment apparatus illustrated in FIG. 2, including mounting and first valve assemblies.
Figure 3B:
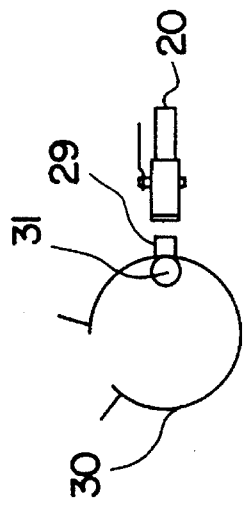

As mentioned above, the fluid source 42 is preferably of conventional construction and is commonly found on harvesting machines. Extension member 24 has a first end and a second end and is of a length sufficient to extend from conduit 28 to a proximal lower portion of either of first and second harvesting members 12, 14. As shown in FIGS. 2, 3A and 3B, the first end of extension member 24 is removably coupled in fluid communication with an outlet neck 29 of a metal collar or other suitable removable attachment means 30. An elbow-shaped pipe 31 made, for example, from 1" metal tubing or the like, is attached at one end in fluid communication with outlet neck 29. The other end of pipe 31 is disposed within conduit 28 facing the fluid source, such that fluid passes through pipe 31 and neck 29 into extension number 24. A clamp or the like 32, shown in FIG. 4, may be provided around the outer portion of extension member 24 to secure extension member 24 to outlet neck 29. Alternatively, the outer and inner diameters of outlet neck 29 and extension member 24 may be sized accordingly to permit satisfactory coupling therebetween without the need for clamp 32. Outlet neck 29 and collar 30 establish fluid communication with conduit 28 such that the pressurized fluid, such as air, may pass from conduit 28 through outlet neck 29, into extension member 24.

The flow of the pressurized fluid from conduit 28 to extension member 24 may be regulated by first valve 20. First valve 20 may be of any of a variety of known constructions, as will be apparent to one having ordinary skill in the art. First valve 20 is adjustable to regulate the flow of the pressurized fluid from conduit 28 to extension member 24, such that when first valve 20 is in a closed position, no fluid will flow into extension member 24 and when first valve 20 is in a fully open position a maximum flow of fluid (as determined by the specifications of the fluid source 42, conduit 28, outlet neck 29 and the diameter of extension member 24) will occur. Of course, there will be an intermediate amount of fluid flow from conduit 28 into extension member 24 when first valve 20 is in any intermediate position.

Figure 4:
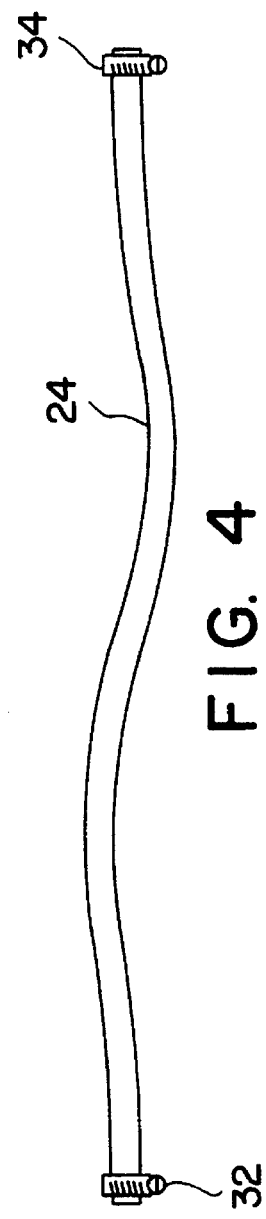
FIG. 4 illustrates various components of the harvester attachment apparatus illustrated in FIG. 2, including an extension member and associated clamps.
Figure 5:
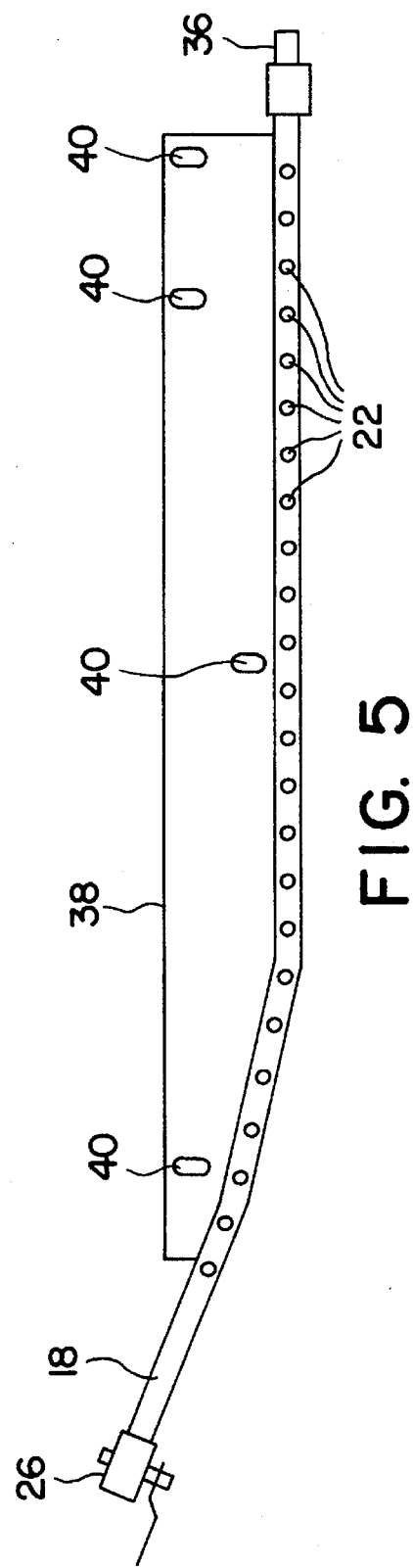
FIG. 5 illustrates the harvester attachment apparatus illustrated in FIG. 2, not coupled to the harvester illustrated in FIG. 1A.

The second end of extension member 24 is removably connected in fluid communication to a first end 36 of pipe 18, as shown in FIGS. 4 and 5. The particular nature of this connection can take any of a variety of known forms, as will be apparent to those skilled in the art, including, for example, the use of an adjustable clamp 34 provided on extension member 24, or by sizing the first end 36 of pipe 18 to fit snugly within extension member 24.

The first end 36 of pipe 18, to which extension member 24 is connected, is located adjacent a proximal lower portion of either of first and second harvesting members 12, 14 and is oriented substantially parallel to the ground. For simplicity of illustration, pipe 18 is depicted in FIG. 2 as being adjacent the lower portion of only one of first and second harvesting members 12, 14.

As shown in FIG. 5, suitable attachment means, such as, for example, a mounting plate 38 or the like, are used to secure pipe 18 in place, such that pipe 18 extends longitudinally adjacent the lower edge of first harvesting member 12. Mounting plate 38, for example, may be secured to first or second harvesting member 12, 14 by means of screws or other fasteners extending through holes 40 provided therein. Pipe 18 may be constructed of any suitable rigid construction such as, for example, metal or the like. Preferably, pipe 18 has an inner diameter of approximately one inch, although pipes having a larger or smaller diameter may also be used.

It should be noted that, as illustrated in FIG. 2, the lower edge of first harvesting member 12 is substantially straight. If this is not the case, that is, if the lower edge of first harvesting member 12 includes bends or curves, then pipe 18 preferably is configured accordingly, as illustrated, for example, in FIGS. 5 and 7, so that pipe 18 remains substantially adjacent, e.g., about 1" to 5" and preferably about 2" to 3", from the lower edge of first or second harvesting member 12, 14 and parallel thereto.

As further illustrated in FIGS. 5 and 7, pipe 18 is provided in an upper surface thereof with a plurality of holes 22. Holes 22, which are preferably spaced at regular intervals such as, for example, approximately one inch apart, may be of any suitable diameter such as, for example, approximately ⅛. Holes 22 may be formed in the upper surface of pipe 18 in a conventional manner, such as by using a drill or punch.

Second valve 26 is provided at or near the second (distal) end of pipe 18, which is uncapped. Second valve 26 serves to provide access to the inside of pipe 18, as may be necessary for cleaning, maintenance or the like. As will be apparent to one of ordinary skill in the art, the particular construction of second valve 26 may take any of a variety of suitable forms and may be the same as, or different from, the construction of first valve 20.

In operation, first valve 20 is opened to a desired position to permit a suitable flow of pressurized fluid from conduit 28 to extension member 24. The pressurized fluid then flows through extension member 24 and into the first end of pipe 18. As the pressurized fluid passes through pipe 18, the fluid will pass upwardly through holes 22. The amount of fluid which passes through each of holes 22 is a function of the volume and rate of the fluid which flows into the first end of pipe 18, as well as the diameter of pipe 18 and holes 22. The amount of fluid which passes through each of the holes 22 is controlled by first valve 20, to be maintained at a level sufficient to suspend or move the crop to be harvested proximate the spindles 16 of first and second harvesting members 12, 14.

As mentioned above, holes 22 are positioned in the upper surface of pipe 18 and the pressurized fluid therefore passes through holes 22 in an upward direction. As used herein, the phrase "in an upward direction" is intended to encompass any direction above horizontal through vertical. That is, if the vertical direction immediately above holes 22 is defined as 0°, then the pressurized fluid which passes out of holes 22 does so in a direction of from 0° to just under 90° clockwise (or just under 90° counterclockwise if pipe 18 is positioned adjacent the lower edge of second harvesting member 14). In a preferred embodiment, holes 22 are oriented to blow the pressurized fluid at an angle of approximately 40°–45° (measured clockwise from vertical). If desired, some of the plurality of holes 22 may be oriented in different directions from others of holes 22 so that the pressurized fluid passes through holes 22 at various upward angles. The pressurized fluid may also reflect off the vertical panels of the opposing harvesting member. As a result, the crop to be harvested can be suspended or moved proximate different ones of spindles 16.

By proper use of the apparatus of the present invention, less of the crop to be harvested will be lost by falling to the ground or left attached to the stalk unharvested. Falling crops will be blown upward by the pressurized fluid passing in an upward direction from holes 22, so as to suspend or move the crop proximate spindles 16. Attached crops will be moved laterally to increase the chances of the crop being contacted by one of the barbed spindles 16. Also, some of the attached crop will be blown off the stalk by the pressurized fluid, thus facilitating its being pulled inside the harvesting member 12, 14 by the revolving spindles 16. As a result, the yield of conventional harvesters may be significantly improved by use of the present invention. In addition, the present invention is simple in construction, installation and maintenance and is inexpensive to build and maintain.

Additional features and variations may be implemented to the specific preferred embodiment discussed herein. For example, the pressurized fluid may be passed through pipes positioned at the lower edges of both first and second harvesting members 12, 14, instead of one or the other harvesting member. Such a configuration would preferably have a second corresponding extension member and a second set of valves. Moreover, extension member 24 may not be necessary, depending on the particular configuration of the harvester 10 being fitted with the present invention. In such cases, the first end of pipe 18 may be coupled in fluid communication directly to conduit 28. In addition, the positions of first and second valves 20, 26 may be varied for ease of installation and access. Either or both of first and second valves 20, 26 may also be deleted, if desired, to further reduce the cost of the apparatus.

It is intended that the specification and examples be considered as exemplary only, with the true scope and spirit of the invention being indicated by the following claims.

What is claimed is:

1. An apparatus for suspending a crop to be harvested by a harvesting machine having crop-engaging members that define a crop-harvesting zone, comprising:

a fluid source for providing a pressurized fluid; and a first pipe, coupled at a proximal end thereof in fluid communication with said fluid source, said first pipe having a section containing a plurality of holes therein, the length of the holed-section of the first pipe being determined so that said section extends substantially the entire length of the crop-harvesting zone defined by the crop-engaging members of the harvesting machine, wherein said holes are oriented such that the pressurized fluid passes through said plurality of holes in an upward direction to move said crop for harvesting.

2. An apparatus according to claim 1, wherein the pressurized fluid passes through said plurality of holes at an angle of approximately 40°–45°.

3. An apparatus according to claim 1, wherein the pressurized fluid passes through said plurality of holes in a plurality of upward directions.

4. An apparatus according to claim 1, further comprising a regulating valve provided between said fluid source and said first pipe, said regulating valve controlling the flow of said pressurized fluid from said fluid source to said first pipe.

5. An apparatus according to claim 4, further comprising an access valve provided at a distal end of said first pipe, said access valve providing access to an interior portion of said first pipe.

6. An apparatus according to claim 1, further comprising an extension member provided in fluid communication between said fluid source and said first pipe.

7. An apparatus according to claim 6, wherein said extension member comprises a hose.

8. An apparatus according to claim 1, wherein said fluid source comprises an air compressor.

9. An apparatus according to claim 1, wherein said fluid source comprises a fan.

10. An apparatus according to claim 1, further comprising:

a second pipe, coupled at a proximal end thereof in fluid communication with said fluid source, said second pipe having a section containing a plurality of holes therein, wherein said holes are oriented such that the pressurized fluid passes through said plurality of holes in an upward direction to move said crop for harvesting.

11. A harvesting apparatus, comprising:

crop-engaging members for receiving a crop to be harvested, said crop-engaging members defining a crop-harvesting zone;

a fluid source, secured to said harvesting apparatus, for providing a pressurized fluid; and a pipe, positioned below said crop-engaging members and coupled at a proximal end thereof in fluid communication with said fluid source, said pipe having a section containing a plurality of holes therein, said holes being oriented such that pressurized fluid passes through said plurality of holes in an upward direction to move said crop proximate said crop-engaging members, wherein the length of the holed-section of the first pipe is determined so that said section extends substantially the entire length of the crop-harvesting zone defined by the crop-engaging members of the harvesting apparatus.

12. An apparatus according to claim 11, wherein the pressurized fluid passes through said plurality of holes at an angle of approximately 40°–45°.

13. An apparatus according to claim 11, wherein the pressurized fluid passes through said plurality of holes in a plurality of upward directions.

14. A harvesting apparatus according to claim 11, further comprising a regulating valve provided between said fluid source and said first pipe, said regulating valve controlling the flow of said pressurized fluid from said fluid source to said first pipe.

15. An apparatus according to claim 14, further comprising an access valve provided at a distal end of said first pipe, said access valve providing access to an interior portion of said first pipe.

16. An apparatus according to claim 11, further comprising an extension member provided in fluid communication between said fluid source and said pipe.

17. An apparatus according to claim 11, wherein said fluid source comprises an air compressor.

18. An apparatus according to claim 11, wherein said fluid source comprises a fan.

19. An apparatus according to claim 11, wherein said extension member comprises a hose.

20. An apparatus according to claim 11, wherein said harvesting apparatus is a cotton harvester.

21. An apparatus according to claim 11, further comprising:

a second pipe, coupled at a proximal end thereof in fluid communication with said fluid source, said second pipe having a section containing a plurality of holes therein, wherein said holes are oriented such that the pressurized fluid passes through said plurality of holes in an upward direction to move said crop for harvesting.

22. A harvesting method comprising the steps of:

advancing a harvesting apparatus proximate a crop to be harvested, said harvesting apparatus having crop-engaging members defining a crop-harvesting zone; and providing a pressurized fluid to a pipe positioned below said crop-engaging members, said pipe having a section having a plurality of holes therein, said holes being oriented such that said pressurized fluid passes through said plurality of holes in an upward direction to move said crop proximate said crop-engaging members, wherein the length of the holed-section of the pipe is determined so that said section extends substantially the entire length of the crop-harvesting zone defined by the crop-engaging members of the harvesting apparatus.

23. A method according to claim 22, wherein the pressurized fluid passes through said plurality of holes at an angle of approximately 40°–45°.

24. A method according to claim 22, wherein the pressurized fluid passes through said plurality of holes in a plurality of upward directions.

25. A harvesting method according to claim 22, further comprising the step of regulating the flow of said pressurized fluid through said pipe.

26. An apparatus for suspending a crop to be harvested, comprising:

a fluid source for providing a pressurized fluid;

a first pipe, coupled at a proximal end thereof in fluid communication with said fluid source, said first pipe having a plurality of holes provided therein, said holes being oriented such that the pressurized fluid passes through said plurality of holes in an upward direction to move said crop for harvesting; and an access valve provided at a distal end of said first pipe, said access valve providing access to an interior portion of said first pipe.

27. An apparatus according to claim 26, wherein the pressurized fluid passes through said plurality of holes at an angle of approximately 40–45° from vertical.

28. An apparatus according to claim 26, wherein the pressurized fluid passes through said plurality of holes in a plurality of upward directions.

29. An apparatus according to claim 26, further comprising a regulating valve provided between said fluid source and said first pipe, said regulating valve controlling the flow of said pressurized fluid from said fluid source to said first pipe.

30. An apparatus according to claim 26, further comprising an extension member provided in fluid communication between said fluid source and said first pipe.

31. An apparatus according to claim 30, wherein said extension member comprises a hose.

32. An apparatus according to claim 26, wherein said fluid source comprises an air compressor.

33. An apparatus according to claim 26, wherein said fluid source comprises a fan.

34. An apparatus according to claim 26, further comprising:
   a second pipe, coupled at a proximal end thereof in fluid communication with said fluid source, said second pipe having a plurality of holes provided therein,
   wherein said holes are oriented such that the pressurized fluid passes through said plurality of holes in an upward direction to move said crop for harvesting.

35. A harvesting apparatus, comprising:
   a harvesting member for receiving a crop to be harvested;
   a fluid source, secured to said harvesting member, for providing a pressurized fluid;
   a first pipe, positioned below said harvesting member and coupled at a proximal end thereof in fluid communication with said fluid source, said pipe having a plurality of holes provided therein, said holes being oriented such that said pressurized fluid passes through said plurality of holes in an upward direction to move said crop proximate said harvesting member; and
   an access valve provided at a distal end of said first pipe, said access valve providing access to an interior portion of said first pipe.

36. An apparatus according to claim 35, wherein the pressurized fluid passes through said plurality of holes at an angle of approximately 40°–45° from vertical.

37. An apparatus according to claim 35, wherein the pressurized fluid passes through said plurality of holes in a plurality of upward directions.

38. A harvesting apparatus according to claim 35, further comprising a regulating valve provided between said fluid source and said first pipe, said regulating valve controlling the flow of said pressurized fluid from said fluid source to said first pipe.

39. An apparatus according to claim 35, further comprising an extension member provided in fluid communication between said fluid source and said first pipe.

40. An apparatus according to claim 39, wherein said extension member comprises a hose.

41. An apparatus according to claim 35, wherein said fluid source comprises an air compressor.

42. An apparatus according to claim 35, wherein said fluid source comprises a fan.

43. An apparatus according to claim 35, wherein said harvesting apparatus is a cotton harvester.

44. An apparatus according to claim 35, further comprising:
   a second pipe, coupled at a proximal end thereof in fluid communication with said fluid source, said second pipe having a plurality of holes provided therein, said holes being oriented such that the pressurized fluid passes through said plurality of holes in an upward direction to move said crop for harvesting.

* * * * *